United States Patent [19]

Visser et al.

[11] 4,294,720

[45] Oct. 13, 1981

[54] PROCESS FOR THE PREPARATION OF GAS MIXTURES

[75] Inventors: Pieter Visser, Amsterdam; Johan P. van de Water, The Hague, both of Netherlands

[73] Assignee: Shell Oil Company, Houston, Tex.

[21] Appl. No.: 101,340

[22] Filed: Dec. 7, 1979

[30] Foreign Application Priority Data

Dec. 22, 1978 [NL] Netherlands .......................... 7812466

[51] Int. Cl.³ ................................................ C01B 2/06
[52] U.S. Cl. ...................................... 252/373; 48/215; 210/761
[58] Field of Search ........................... 252/373; 48/215; 210/761

[56] References Cited

U.S. PATENT DOCUMENTS

| | | | |
|---|---|---|---|
| 2,665,249 | 1/1954 | Zimmermann | 210/2 |
| 3,615,297 | 10/1971 | Dille et al. | 252/373 X |
| 3,620,700 | 11/1971 | Schlinger et al. | 252/373 X |
| 3,764,547 | 12/1973 | Schlinger et al. | 252/373 X |
| 3,964,882 | 6/1976 | Staudinger | 252/373 X |

*Primary Examiner*—Howard T. Mars

[57] ABSTRACT

A process for removing soot from synthesis gas streams is disclosed. The process is characterized by oxidation of the soot in the presence of water.

5 Claims, 1 Drawing Figure

U.S. Patent   Oct. 13, 1981   4,294,720
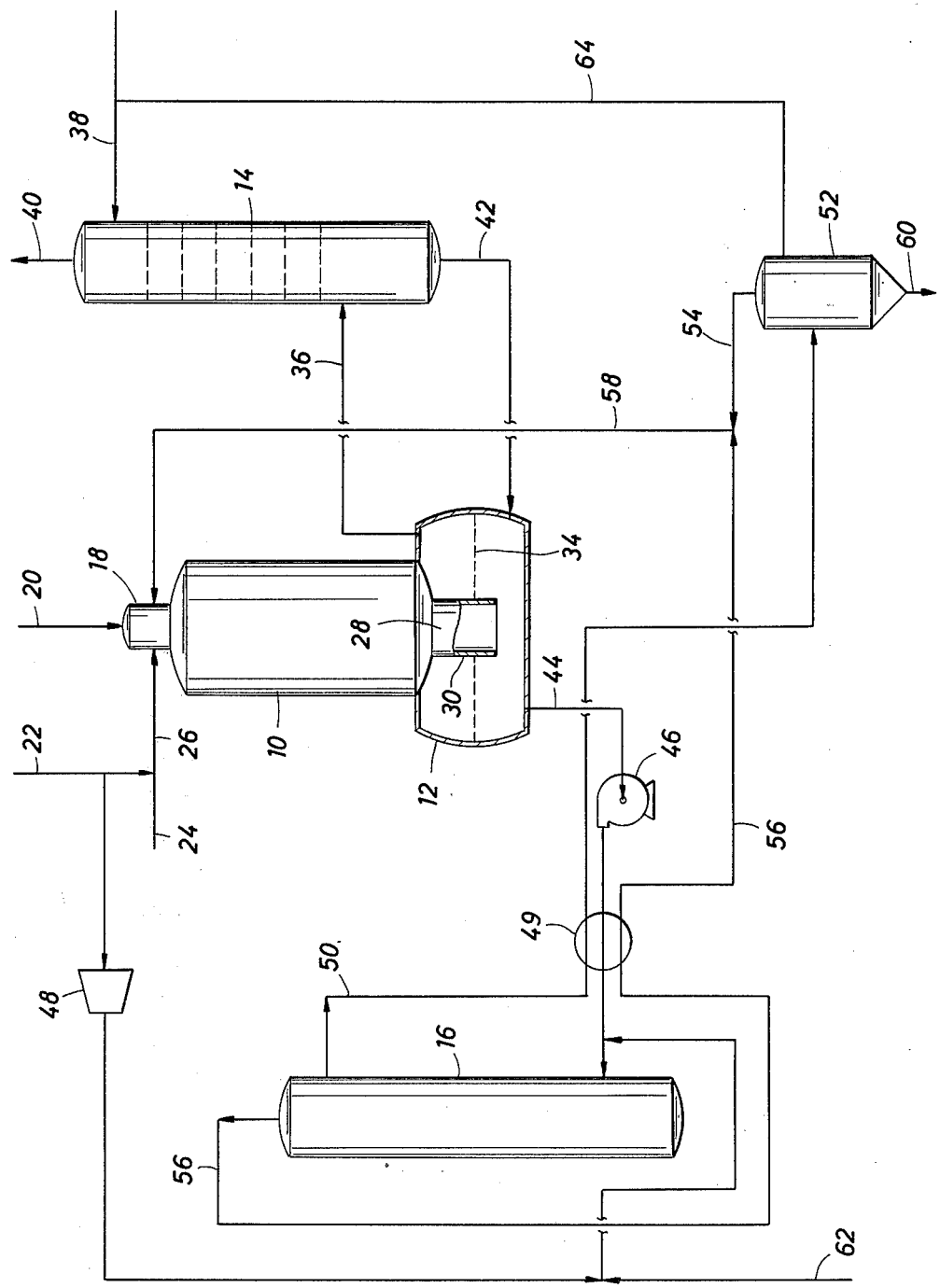

PROCESS FOR THE PREPARATION OF GAS MIXTURES

BACKGROUND OF THE INVENTION

This invention relates to an improved process for the preparation of synthesis gas mixtures containing hydrogen and carbon monoxide.

By virtue of the fact that synthesis gas preparation processes rely on the partial combustion of hydrocarbons, some soot is generally present in the raw product gas from the reaction zone. While the soot can be removed from the gas, normally by quenching and subsequent water scrubbing, the soot-containing liquor thus obtained presents a problem. In some cases it can be worked up and mixed back into the hydrocarbon feedstock, in others the soot may be separated from the liquids after agglomeration. In either case, there may additionally be a quantity of effluent water which requires treatment prior to disposal. Where the worked-up liquor (with a water content reduced to about 10 %w) is mixed back into the feedstock, difficulties can arise due to the build-up of non-combustible materials in the reactor, such as ash and metals.

Accordingly, the invention seeks to provide an integrated process for the preparation of gas mixtures containing hydrogen and carbon monoxide, the process being characterized by economic disposal of the soot.

SUMMARY OF THE INVENTION

The invention, therefore, relates to a process for preparing a gas mixture containing hydrogen and carbon monoxide which comprises partially oxidizing a hydrocarbon feedstock with oxygen or an oxygen-containing gas in a reactor at elevated pressure to produce a raw product gas, contacting the raw product gas with water to remove soot and other contaminating material from the gas and produce a liquor, and contacting the liquor with oxygen or an oxygen-containing gas at a temperature between 240° C. and 375° C., preferably between 300° and 350° C., at a pressure at least equal to the vapor pressure of water at the temperature employed.

Under these conditions, the soot is combined with the oxygen substantially to produce $CO_2$ in an exothermic process, and useful quantities of heat are produced. The process is particularly advantageous as the liquor leaving, for example, the quench zone for the raw product gas, is generally at a temperature of some 250° C. and at super atmospheric pressure, thus reducing the energy requirements of the soot oxidation step.

Additionally, the soot oxidation step is considerably more easily accomplished using oxygen. Not only does the reaction take place more rapidly, but the use of oxygen reduces substantially the size of the compressor required to increase the pressure of the oxidizing gas to above the vapor pressure of water at the operating temperature. And, in general, a supply of oxygen already under pressure is available for the partial oxidation process itself. Thus it results in a comparatively small additional cost to use the small quantity of oxygen required, although it will normally need to be compressed to the higher pressure obtaining the in the soot oxidation step.

In a typical gasification process, 1 to 2 %w soot may be made, based on the feedstock. This is collected in the water in the quench zone and eventually also in a water wash zone to produce a soot-containing liquor comprising 1-2 %w soot/ash. For the carbon part of the soot approximately 2.7 kg oxygen/kg soot will be required to oxidize it completely. Since the soot has a calorific value of some 4000 kcal/kg, the heat required for the treatment can, after a start-up period, be generated by the oxidation of the soot and, indeed, some additional useful and recoverable heat may be produced in the way.

As the process takes place more rapidly at higher temperatures, it is advantageous to preheat the liquor entering the reactor as much as possible. This may conveniently be accomplished by heat exchange with the treated liquor leaving the soot oxidation reactor.

The water effluent from the soot oxidation reactor will normally contain ash and some metals which can be separated out. The water can then generally be disposed of without treatment, or passed to a biotreater. The metals and/or ash can be recovered as desired.

As noted, the gases generated by the soot treatment comprise substantially steam and $CO_2$. Because of its $CO_2$ content and the presence of other contaminants, the steam raised in the soot oxidation reactor cannot be used conventionally, but can usefully be returned to the partial oxidation reactor.

The means for treating the liquor may comprise a soot oxidation reactor which receives the liquor at an elevated pressure, preferably in excess of or equal to the vapour pressure of water at the temperature at which the wet oxidation is carried out, e.g., above approximately 240° C., but it may be necessary in certain cases for the temperature to be increased to 310° C. or above for the reaction to be effective. For start up purposes, live steam may be injected into the reactor.

The temperature of the reaction may be controlled by the removal of saturated steam from the reactor, and the steam may conveniently be injected into the gasification reactor.

In order to ensure efficient use of the oxygen, the soot oxidation reaction vessel may be provided with mixing means, such as baffles or a stirrer. It may also be desirable to carry the process out in several smaller vessels in series, not only to reduce the oxygen demand, but also due to the high pressure and highly corrosive environment.

The reactor itself needs to be highly corrosive resistant, and for this reason it may advantageously be specially lined, e.g., with nickel.

For the most efficient operation of the wet oxidation of the soot, the liquor should be as concentrated as possible, which in practice means an aqueous suspension with about 1 to 2 %w soot due to the very large surface area and the pore structure of the soot.

In one embodiment of the invention, gas from the partial oxidation reactor is quenched directly in a water bath in a quench vessel, and on leaving the latter passes to a scrubber where it is scrubbed by flowing countercurrent to wash water. The used wash water is then passed to the quench vessel so that a minimum quantity of water is used to make the liquor containing the soot.

The invention will now be further described with reference to the accompanying drawing.

The plant essentially comprises a partial oxidation reactor 10 with an integral quench vessel 12, a scrubber 14 and a soot oxidation reactor 16.

More particularly, the reactor 10 comprises a vertical reactor vessel provided at its upper end with a burner 18 which is arranged to receive heavy fuel oil via line 20 and oxygen and steam by lines 22 and 24, respectively, which are combined into a single inlet 26 to the burner 18. At the lower end 28 of the reactor there is an outlet provided with a conduit 30 which protrudes into the quench vessel 12, vessel 12 being partly filled with water. The water level 34 is maintained above the lower end of the conduit 30, so that gas leaving the reactor 10 must pass through the water phase.

The gas stream leaves the quench vessel 12 by line 36 and passes to the scrubber 14 where it enters at the lower end. The gas then flows upwards countercurrent to wash water which enters at 38. The scrubbed gas leaves by the top of the scrubber 14 by line 40, while the water leaves by the bottom of the vessel via line 42 to the quench vessel.

The water in the quench vessel 12 becomes thickened as it absorbs soot made in the partial oxidation reactor 10, and the resulting liquor is drawn off from the quench vessel 12 through line 44. Feed pump 46 increases its pressure and injects it into the bottom of the soot oxidation reactor 16. Oxygen from line 22 is pressurized in a compressor 48 and injected into the liquor in line 44 just before entry into the reactor 16.

In order to accelerate the soot oxidation process, heat is transferred in a heat exchanger 49 from the treated liquor in line 50 to the untreated liquor in line 44 downstream of the feed pump 46.

After the required residence time in the soot oxidation reactor, the treated liquor leaves it from its upper end by line 50 to an ash separator 52 where the majority of the ash is separated from the now substantially soot-free water. Water from separator 52 can be recirculated to the scrubber 14 via line 64.

A certain amount of gas, mainly $CO_2$, and steam is drawn off from the soot oxidation reactor through line 56. The gas and steam are conveniently reinjected into the upper part of the reactor 10 via line 58.

Ash in an aqueous suspension leaves the ash separator 52 by line 60 for suitable after-treatment, mineral recovery, etc. as required. Gas and steam are recycled to the reactor 10 via the lines 54 and 58.

In operation, the fuel oil entering at 20 is reacted with oxygen and steam in the reactor 10 to produce hydrogen and carbon monoxide under partial oxidation conditions at a pressure of 60 bar. At the lower end 28 of the reactor, the gas temperature is on the order of 1350° C. and is quenched to approximately 240° C. in the quench vessel 12 as it passes through the water.

The gas is scrubbed at the same temperature in the scrubber 14 and leaves as a mixture of gas and saturated steam.

The liquor leaving the quench vessel by line 44 is pressurized to 120 bar and during the soot wet oxidation step attains a temperature of approximately 320° C. The pressure in the reactor is such that the majority of the water will remain in the liquid phase, and any steam which is eventually generated due to a temperature increase will serve to moderate the temperature.

For start up only, live steam can be added to the oxygen through line 62 to bring the soot oxidation reactor up to temperature so that the reaction can take place, and become self-sustaining.

The process of the invention is extremely effective for preparing gas mixtures of hydrogen and carbon monoxide without creating a water treatment problem. The treated liquor which leaves the plant contains substantially only non-combustible material which can be settled out from substantially clean water, and the water can be passed directly, for example, to a biotreater or sometimes be discharged directly as effluent. The process of the invention is particularly advantageous because of its economic use of waste heat and the fact that a pressurized oxygen source is usually readily available.

What is claimed is:

1. A process for preparing a gas mixture containing hydrogen and carbon monoxide comprising partially oxidizing a hydrocarbon feedstock with oxygen or an oxygen-containing gas in a partial oxidation reactor at elevated pressure to produce a raw product gas, contacting the raw product gas in a quench zone with water to remove soot and other contaminating material from the gas and producing a gas mixture and a soot-containing liquor, removing soot-containing liquor from the quench zone, and contacting the liquor removed with oxygen or an oxygen-containing gas in a soot oxidation reactor at a temperature between 240° C. and 375° C., and at a pressure at least equal to the vapor pressure of water at the temperature used to oxidize the soot in the liquor and producing $CO_2$ and a substantially soot-free water effluent.

2. The process of claim 1, in which the liquor is contacted at a temperature between 300° and 350° C.

3. The process of claim 2, in which the liquor has a soot concentration between 0.5 and 2 %w.

4. The process of claim 3, in which the liquor has a soot concentration between 0.8 and 1.3 %w.

5. The process of claim 2 wherein the $CO_2$ produced in the soot oxidation reactor is sent for use in the partial oxidation reactor.

* * * * *